US009108885B2

(12) United States Patent
Todd et al.

(10) Patent No.: US 9,108,885 B2
(45) Date of Patent: Aug. 18, 2015

(54) ALUMINA-BASED CERAMIC MATERIALS AND PROCESS FOR THE PRODUCTION THEREOF

(75) Inventors: Richard Ian Todd, Oxford (GB); Noor Azlin Yahya, Oxford (GB)

(73) Assignee: Isis Innovation Limited, Oxford, Oxfordshire (GB)

( * ) Notice: Subject to any disclaimer, the term of this patent is extended or adjusted under 35 U.S.C. 154(b) by 95 days.

(21) Appl. No.: 13/638,046

(22) PCT Filed: Mar. 31, 2011

(86) PCT No.: PCT/GB2011/050667
§ 371 (c)(1),
(2), (4) Date: Dec. 11, 2012

(87) PCT Pub. No.: WO2011/121365
PCT Pub. Date: Oct. 6, 2011

(65) Prior Publication Data
US 2013/0090231 A1   Apr. 11, 2013

(30) Foreign Application Priority Data
Mar. 31, 2010   (GB) .................................. 1005457.5

(51) Int. Cl.
*C04B 35/10*       (2006.01)
*C04B 35/111*      (2006.01)
*C04B 35/117*      (2006.01)

(52) U.S. Cl.
CPC .............. *C04B 35/10* (2013.01); *C04B 35/111* (2013.01); *C04B 35/117* (2013.01);
(Continued)

(58) Field of Classification Search
CPC ....... C04B 35/013; C04B 35/10; C04B 35/103
USPC .......................................................... 264/667
See application file for complete search history.

(56) References Cited

U.S. PATENT DOCUMENTS 4,157,898 A     6/1979   Walker et al.
5,509,558 A *   4/1996   Imai et al. ..................... 218/143
(Continued)

FOREIGN PATENT DOCUMENTS

EP       0634756 A2    1/1995
EP       1702900 A1    9/2006

OTHER PUBLICATIONS

Ortiz-Merino & Todd, Relationship Between Wear Rate, Surface Pullout and Microstructure during Abrasive Wear of Alumina and Alumina/SiC Nanocomposites, Acta Materialia, 2005, 2245-3357, vol. 53.
(Continued)

*Primary Examiner* — Joseph S Del Sole
*Assistant Examiner* — Russell Kemmerle, III
(74) *Attorney, Agent, or Firm* — Hodgson Russ LLP

(57) ABSTRACT

The present invention provides a process for producing a ceramic material, which comprises: (a) forming a green compact by compacting a powder comprising alumina and carbon, wherein the powder is substantially free of silicon carbide and wherein the amount of carbon present in the powder does not exceed 0.1% by weight of the powder; and (b) sintering the green compact under non-oxidising conditions to form a ceramic material comprising alumina and carbon, wherein the green compact is sintered at a temperature of less than 1550° C. Ceramic materials obtainable by said process are also provided.

11 Claims, 2 Drawing Sheets

(52) U.S. Cl.
CPC ............ *C04B 2235/3206* (2013.01); *C04B 2235/3217* (2013.01); *C04B 2235/422* (2013.01); *C04B 2235/425* (2013.01); *C04B 2235/5445* (2013.01); *C04B 2235/656* (2013.01); *C04B 2235/6581* (2013.01); *C04B 2235/6587* (2013.01); *C04B 2235/668* (2013.01); *C04B 2235/785* (2013.01); *C04B 2235/786* (2013.01); *C04B 2235/96* (2013.01)

(56) References Cited

U.S. PATENT DOCUMENTS

2006/0073349 A1    4/2006   Aihara et al.
2006/0205585 A1*   9/2006   Mori et al. .................. 501/127

OTHER PUBLICATIONS

Sedlacek et al., Abrasive Wear of Al2O3-SiC and Al2O2-(SiC)-C Composites with Micrometer- and Submicrometer-sized Alumina Matrix Grains, J. of the European Ceramic Society, 2008, 2983-2993, vol. 28.

Sedlacek et al., Alumina-Carbon Composites with High Hardness, Key Engineering Materials, 2004, 841-844, vols. 264-268.

Zapata-Solvas et al., High-Temperature Mechanical Behavior of Al2O3/Graphite Composites, J. of the European Ceramic Society, 2009, 3205-3209, vol. 29.

Limpichaipanit, Apichart, Wear and Indentation of Al2O3/SiC Nanocomposites, University of Oxford, 2008, 1-232.

* cited by examiner

ALUMINA-BASED CERAMIC MATERIALS AND PROCESS FOR THE PRODUCTION THEREOF

FIELD OF THE INVENTION

This invention relates to ceramic materials and to processes for their production. In particular, the invention relates to alumina-based ceramic materials. The materials may be useful in the manufacture of various products, including wear resistant products.

BACKGROUND TO THE INVENTION

Alumina (aluminium oxide; $Al_2O_3$) has been used in structural components such as heat engines and other applications requiring good oxidation, corrosion resistance and high wear resistance. However, the low toughness and brittle failure mode of monolithic alumina significantly reduces the reliability of the material during use.

Efforts to improve the mechanical properties of monolithic alumina have been the focus of attention of engineers and ceramic researchers for many years. As a result, a number of different approaches have been proposed in this area. Of these, the use of second phase reinforcements has been one of the most successful approaches. The second phase can play an important role, such as providing obstacles that can divert a propagating crack or act as bridging elements, thus increasing the crack resistance and flexure strength of the material. It has been found that the properties of alumina may be enhanced by incorporating a fine dispersion of a second ceramic phase throughout the material.

In particular, it has been found that the inclusion of a second phase comprising silicon carbide (SiC) nanoparticles may improve the wear resistance and surface finish of alumina. The silicon carbide nanoparticles cause the fracture mode of the material to change from intergranular to transgranular. The silicon carbide-containing materials have significantly improved wear resistance compared with monolithic alumina. According to Ortiz-Merino et al (Acta Mater., 53, 3345-57), the addition of only 2 vol % silicon carbide improves wear properties by a decrease in the number of pullouts and also a reduction in pullout size, both resulting mainly from the change in fracture mode.

Despite having commercially desirable properties, the cost of the silicon carbide nanopowders means that the materials may be significantly more expensive to produce than alumina. Moreover, the green compacts are usually sintered at relatively high temperature and pressure. This can add further expense and can limit the ability to produce large or complicated parts.

SUMMARY OF THE INVENTION

According to the present invention, a ceramic material may be produced by a process comprising:
(a) forming a green compact by compacting a powder comprising alumina and carbon, wherein the powder is substantially free of silicon carbide and wherein the amount of carbon present in the powder does not exceed 0.1% by weight of the powder; and
(b) sintering the green compact under non-oxidising conditions to form a ceramic material comprising alumina and carbon, wherein the green compact is sintered at a temperature of less than 1550° C.

Ceramic materials produced in accordance with the present invention have been found to exhibit improved wear resistance and surface finish compared with monolithic alumina. Moreover, since the materials may be produced using relatively inexpensive carbon powders and under moderate sintering conditions, the materials may be significantly cheaper to produce than e.g. alumina-silicon carbide nanocomposite materials.

DESCRIPTION OF VARIOUS EMBODIMENTS

Figure 1:
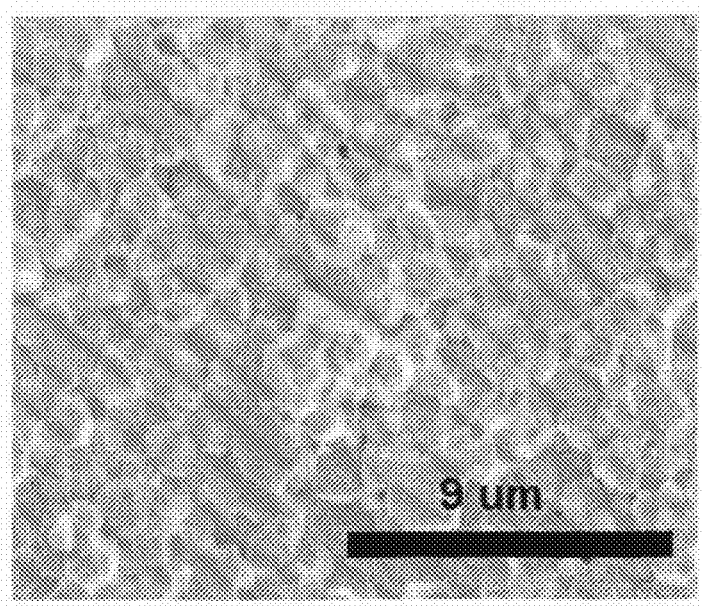
FIGS. 1 and 2 are scanning electron microscope (SEM) images showing the fractured surfaces of an alumina material and a material of the present invention.

According to a process of the present invention, a green compact is prepared by compacting a powder comprising alumina and carbon, wherein the carbon is present in the powder in an amount of not more than 0.1% by weight of the powder.

The powder preferably comprises at least 99% by weight of alumina. In an embodiment, the powder comprises at least 99.5% by weight of alumina, e.g. at least 99.75% by weight of alumina, e.g. at least 99.9% by weight of alumina. In an embodiment, the alumina is in the form of $\alpha$-$Al_2O_3$.

Preferably, the powder is prepared using an alumina powder having a purity of at least 95%, e.g. at least 99%, e.g. at least 99.5%, e.g. at least 99.9%. Alumina powders having a purity of greater than 99.99% are known in the art. For example, an alumina powder in the Taimicron™-D series (Taimei Chemicals Co., Ltd) may be used.

In an embodiment, the powder comprises alumina particles having an average diameter of from about 1 nm to about 1 µm, e.g. from about 10 nm to about 1 µm, e.g. from about 50 nm to about 500 nm, e.g. from about 100 nm to about 200 nm, e.g. about 150 nm.

The powder may comprise carbon in the form of inorganic carbon (e.g. elemental carbon) and/or carbon in the form of organic carbon. For example, the powder may comprise carbon in the form of carbon particles and/or carbon in the form of an organic precursor. Suitable organic precursors are known in the art and may exist in liquid or solid form.

In a preferred embodiment, the carbon is present in the form of carbon particles. In an embodiment, the carbon particles comprise graphite particles.

The powder contains carbon in an amount of not more than 0.1% by weight of the powder. In an embodiment, the powder contains carbon in an amount of from 0.001% to 0.1%, e.g. from about 0.001% to about 0.099%, e.g. from about 0.001% to about 0.075%, e.g. from about 0.001% to about 0.05%, e.g. from about 0.01% to about 0.05%, e.g. from about 0.01% to about 0.04%, e.g. from about 0.01% to about 0.03%, e.g. from about 0.01% to about 0.02% by weight of the powder.

In an embodiment, a micron or sub-micron carbon powder is used. In an embodiment, the powder contains carbon particles having an average diameter of from about 0.5 nm to about 1 µm, e.g. from about 1 nm to about 1 µm, e.g. from about 0.1 µm to about 1 µm, e.g. from about 0.1 µm to about 0.5 µm, e.g. from about 0.1 µm to about 0.25 µm. In an embodiment, the carbon particles have an average diameter of from about 0.4 µm to about 0.6 µm. In an embodiment, the average diameter of the carbon particles does not exceed that of the alumina particles. The carbon particles may be formed by milling larger particles of carbon (e.g. having average diameters of up to about 100 μm) to the desired size.

Preferably, the powder is prepared using carbon having a purity of at least 95%, e.g. at least 99%, e.g. at least 99.5%, e.g. at least 99.9%. Suitable carbon powders are known in the art. For example, graphite powder sold under the trade name KS6 (Lonza) may be used.

The powder may comprise one or more additional components, e.g. selected from sintering aids. For example, the powder may comprise magnesium oxide and/or another component which inhibits abnormal grain growth.

The powder is substantially free of silicon carbide, which normally contains trace amounts of free carbon and other impurities. In an embodiment, the powder comprises less than 0.01% by weight of silicon carbide, e.g. less than 0.001% by weight of silicon carbide, e.g. less than 0.0001% by weight of silicon carbide, wherein the foregoing values refer to the percentages by weight of the powder. In an embodiment, silicon carbide is entirely absent from the powder. In an embodiment, the powder is substantially free of other sources of silicon (e.g. silicon dioxide). In an embodiment, carbon particles and/or an organic precursor are the only source of carbon in the powder. In an embodiment, carbon particles are the only source of carbon in the powder.

The powder may be produced in accordance with techniques known in the art. In an embodiment, the powder is obtained by milling the alumina, carbon and any optional components. By way of illustration, and without limitation, the powder may be prepared by dispersing alumina and carbon powders and a milling medium (e.g. alumina balls) in an alcohol such as ethanol to form a homogeneous slurry. The slurry may then be ball milled, dried and subsequently dry ball milled. The resulting powder may then be passed through a sieve to remove any agglomerates and then calcined.

The powder is compacted to form a green compact. The term "green compact" as used herein and as recognised by those skilled in the art refers to an unsintered powder compact. The green compact may be formed in accordance with techniques known in the art. In an embodiment, the powder is subjected to uniaxial pressing under a pressure of e.g. from about 10 MPa to about 200 MPa, e.g. from about 25 MPa to about 75 MPa, e.g. about 50 MPa. In an embodiment, the powder is subjected to cold isostatic pressing under a pressure of e.g. from about 100 MPa to about 350 MPa, e.g. from about 150 MPa to about 250 MPa, e.g. about 200 MPa. In an embodiment, the powder is subjected to uniaxial pressing and cold isostatic pressing.

The green compact is sintered at a temperature of less than 1550° C. In an embodiment, the green compact is sintered at a temperature of about 1500° C. or less, e.g. at a temperature of from about 1300° C. to about 1500° C. In an embodiment, the green compact is sintered at a temperature of from about 1400° C. to about 1500° C., e.g. at about 1400° C., about 1450° C. or about 1500° C. In an embodiment, the green compact is sintered at a temperature of less than 1500° C., e.g. at a temperature of from 1350° C. to 1499° C., e.g. at a temperature of from 1350° C. to 1475° C. In an embodiment, the green compact is sintered under a graphite powder bed.

The green compact is sintered under non-oxidising conditions, in order to prevent oxidation of the carbon in the material. Suitable conditions will be apparent to those skilled in the art. For example, an inert atmosphere may be used. The inert atmosphere may comprise an inert gas such as argon or nitrogen.

In an embodiment, the green compact is sintered under applied pressure. In an embodiment, the green compact is sintered under an applied pressure of less than 250 MPa, e.g. less than 100 MPa, e.g. less than 75 MPa, e.g. less than 50 MPa, e.g. less than 25 MPa, e.g. less than 10 MPa. In an embodiment, the green compact is sintered by hot pressing or hot isostatic pressing.

Preferably, the green compact is sintered in the absence of applied pressure. Thus, the green compact may be sintered by pressureless sintering. The use of pressureless sintering may lower the cost of the production process and facilitate the formation of large pieces or complex shapes. In an embodiment, the green compact is sintered in vacuo using a vacuum furnace.

In an embodiment, the green compact is sintered for a period of from about 0.5 hours to about 24 hours, e.g. from about 0.5 hours to about 12 hours, e.g. from about 0.5 hours to about 6 hours, e.g. from about 0.5 hours to about 3 hours, e.g. about 1 hour. The heating and cooling rates of the material may be suitably controlled. For example, the material may be heated and/or cooled at a rate of from about 5° C. per minute to about 1000° C. per minute, e.g. from about 5° C. per minute to about 500° C. per minute, e.g. from about 5° C. per minute to about 100° C. per minute, e.g. from about 5° C. per minute to about 50° C. per minute, e.g. from about 5° C. per minute to about 10° C. per minute.

The process yields a ceramic material comprising alumina and a trace amount of carbon. In an embodiment, the material comprises at least 99% by weight of alumina, e.g. at least 99.5% by weight of alumina, e.g. at least 99.75% by weight of alumina. The amount of carbon in the material will typically be less than 0.1% by weight of the material. For instance, the amount of carbon in the material may range from about 0.001% to 0.099%, e.g. from about 0.001% to about 0.075%, e.g. from about 0.001% to about 0.05%, e.g. from about 0.01% to about 0.05%, e.g. from about 0.01% to about 0.04%, e.g. from about 0.01% to about 0.03%, e.g. from about 0.01% to about 0.02% by weight of the material.

The material is also substantially free of silicon carbide. In an embodiment, the material contains less than 0.01% by weight of silicon carbide, e.g. less than 0.001% by weight of silicon carbide, e.g. less than 0.0001% by weight of silicon carbide. In an embodiment, silicon carbide is entirely absent from the material. In an embodiment, the material is substantially free of other sources of silicon (e.g. silicon dioxide).

In an embodiment, the average grain size of the material is from about 0.5 μm to about 50 μm, e.g. from about 0.5 μm to about 20 μm, e.g. from about 0.5 μm to about 10 μm, e.g. from about 0.5 μm to about 5 μm, e.g. from about 0.5 μm to about 3 μm, e.g. from about 0.5 μm to about 2.5 μm, e.g. from about 1 μm to about 2.5 μm, e.g. from about 1 μm to about 2 μm. In an embodiment, the average grain size of the material is less than 2.5 μm.

In an embodiment, the relative density of the material is at least 80%, e.g. at least 90%, e.g. at least 95%, e.g. at least 99%. The relative density may be determined using the Archimedes method and is expressed as a percentage of the theoretical density of the material.

In an embodiment, carbon particles are substantially absent from the grain boundary and/or the alumina matrix of the material. In an embodiment, the material is substantially free of discrete particles of carbon and/or other discrete particles.

The material may exhibit a predominantly transgranular mode of fracture. The consequent reduction in size of the pieces of material removed by brittle fracture during wear may lead to higher wear resistance compared with monolithic alumina. Thus, the materials may exhibit improved wear resistance and/or improved surface finish compared with monolithic alumina.

The materials may be used in a variety of settings. For example, the materials may be used in the manufacture of wear resistant products. The materials may be used in industry, for example as blades and channels in paper making apparatus, thread-guides in the textile industry, nozzles and valve parts for use in equipment managing abrasive slurries. The materials may be used to form products such as mechanical seals and ceramic discs, and may also be useful in lightweight body armour and vehicle armour. It is anticipated that the materials described herein may find application in any area where alumina is presently used.

The following non-limiting Example illustrates the present invention.

EXAMPLE

Alumina-carbon and alumina specimens were prepared by powder processing and densification, and their microstructure analysed.

Materials and Experimental Procedures

All specimens were prepared using Taimicron™ DAR α-alumina powder (Taimei Chemicals Co., Ltd., Tokyo, Japan), having a mean particle size of 150 nm and a purity of greater than 99.99%.

Alumina-carbon specimens were prepared using carbon in the form of graphite KS6 (Lonza, Germany, 6 μm), which was added in an amount of 0.012%, 0.036% or 0.050% by weight. For every 100 g of alumina powder, 350 ml of ethanol was added and 400 g of alumina balls were used as the milling media. 0.25 wt % MgO powder was added to prevent abnormal grain growth. Ball milling was carried out for 24 hours in a plastic bottle. The ball milling speed was optimized so that the balls hit one another to break all agglomerates effectively. The slurry was then transferred to a tray and dried in an oven. Subsequently, the powder was dry ball milled for another 24 hours to obtain a fine powder before passing through a 150 μm sieve to ensure that there were no agglomerates. Finally, the powder was calcined at 250° C. for 2 hours to remove all ethanol and plastic from the milling bottle. Alumina specimens were prepared in an analogous manner, except that the final powder was calcined at 600° C. for 1 hour to remove organic components.

Dense specimens (30.1 mm diameter and 4 mm thickness) were then fabricated. Green compacts were obtained by uniaxially pressing each powder at 50 MPa followed by cold isostatic pressing (CIP) at 200 MPa, in order to densify the materials prior to pressureless sintering. Specimens were sintered in vacuo using a vacuum furnace (Lenton, UK) at three different temperatures (1500° C., 1450° C. and 1400° C.) for 1 hour. The heating and cooling rates were programmed at 5° C. per minute. A number of specimens were also sintered at 1500° C. under a graphite powder bed.

The densities of the resulting materials were measured using the Archimedes method. The relative density of each material was then determined.

An SEM was used to measure average grain sizes and the fracture mode of the materials. For examination in the SEM, a ceramic disc was cross-sectioned using a linear high precision diamond saw (Isomet 5000, Buehler). The surface was sequentially polished (MOTOPOL 2000, Buehler) by lapping on a 25 μm resin-bonded alumina polishing wheel until flat, with a wheel speed of 150 rpm and a force of 10 N per sample, followed by polishing on a 6 μm grit resin-bonded iron polishing wheel to remove approximately 100 to 150 μm, and then on a 3 μm soft cloth and finally on a 1 μm soft cloth to achieve the finishing surface. The polished samples were thermally etched in a vacuum furnace at 50° C. below their sintering temperature for 15 minutes to reveal grain boundaries. Samples were then gold sputter coated for 90 seconds. Electro-conductive silver was applied to prevent surface charging. Average grain sizes (G) were measured directly from SEM (JSM 6300, JEOL, Japan) images using the linear intercept method of Wurst et al (J. Am. Ceram. Soc., 55, 109). At least 300 intercepts were counted for each measurement.

Fracture modes were determined by examining the fracture surfaces of cross-sectioned samples using the same SEM. The mode of fracture was classified as intergranular, transgranular or a mixture of both.

The wear resistance of the materials was also tested. Briefly, a micro-scale abrasion wear tester was used in which a metal sphere and an abrasive (an SiC slurry) were used to form a crater in a sample of material. Samples having a thickness of about 3 mm were used. The radius of the metal sphere was 1.25 cm. The velocity of the metal sphere was set using Compend 2000 software. The diameter of the wear crater was measured using an optical microscope. The wear coefficient (k) was calculated from the distance traveled by the sphere and the diameter of the crater. Wear resistance is expressed as the inverse of the wear coefficient.

Results

In all cases, the relative density of the materials was at least 99.6%. The average grain sizes of the materials are shown in the following table:

| Material | Carbon Added (weight %) | Temperature (° C.) | Grain size (μm) |
|---|---|---|---|
| $Al_2O_3$ | 0 | 1500 | 2.0 ± 0.0 |
| | | 1450 | 1.4 ± 0.1 |
| | | 1400 | 1.0 ± 0.0 |
| $Al_2O_3/C$ | 0.012 | 1500 | 2.3 ± 0.2 |
| | 0.036 | | 2.4 ± 0.2 |
| | 0.050 | | 2.0 ± 0.1 |
| | 0.012 | 1450 | 1.1 ± 0.2 |
| | 0.036 | | 1.3 ± 0.2 |
| | 0.050 | | 1.5 ± 0.0 |
| | 0.012 | 1400 | 1.0 ± 0.1 |
| | 0.036 | | 1.0 ± 0.0 |
| | 0.050 | | 0.8 ± 0.1 |
| $Al_2O_3/C$ (under a graphite powder bed) | 0.012 | 1500 | 2.4 ± 0.1 |
| | 0.036 | | 1.9 ± 0.1 |
| | 0.050 | | 0.9 ± 0.0 |

Figure 2:
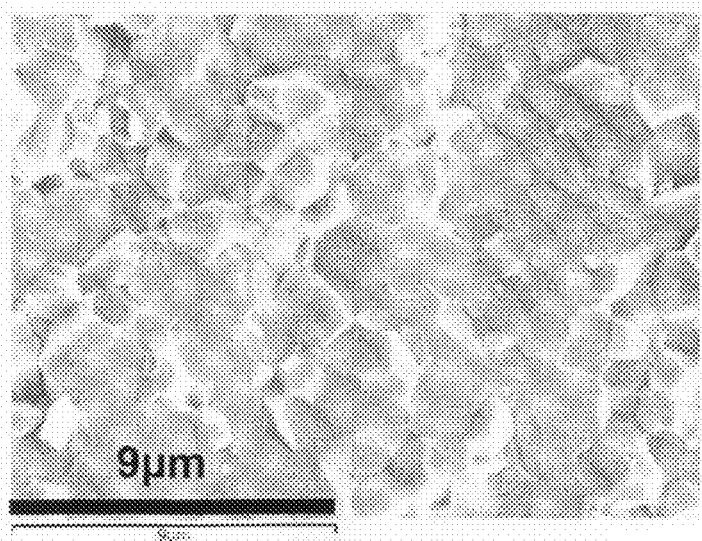

As can be seen from FIG. 1, the alumina materials showed a fracture surface typical of polycrystalline alumina, the materials having a predominantly faceted appearance indicating failure by intergranular fracture. However, as FIG. 2 shows, the surface appearance of the alumina-carbon materials consisted mainly of the transgranular fracture mode. Thus, the inclusion of a trace amount of carbon in the alumina led to a similar change in fracture mode to that observed in the case of alumina-silicon carbide nanocomposites.

Figure 3:
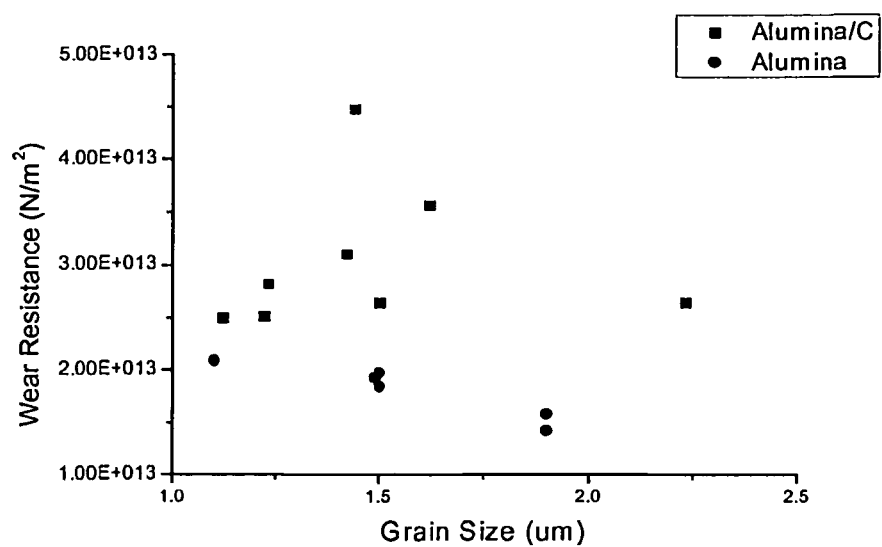
FIG. 3 is a graph comparing the wear resistance of alumina materials with materials of the invention.
Figure 4:
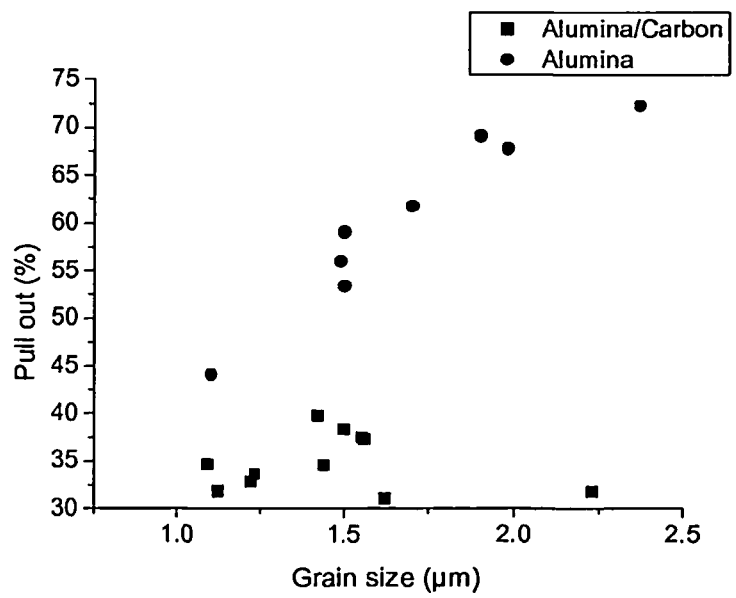
FIG. 4 is a graph comparing the degree of pull-out of alumina materials with materials of the invention.

Plots of the wear resistance and pull-out versus grain size of alumina and alumina-carbon materials are depicted in FIGS. 3 and 4. It can be seen from these figures that the alumina-carbon materials were found to be more wear resistant than their alumina counterparts. The increased wear resistance of the materials may be attributed to the higher energy required for initiation of the transgranular fracture mode compared with the intergranular mode of pure alumina.

It will be understood that the present invention has been described above purely by way of example, and modification of detail can be made within the scope of the invention. Each feature disclosed in the description, and where appropriate the claims and drawings may be provided independently or in any appropriate combination.

The invention claimed is:

1. A process for producing a ceramic material, which comprises:
   (a) forming a green compact by compacting a powder comprising alumina and carbon, wherein the powder is substantially free of silicon carbide and wherein the amount of carbon present in the powder does not exceed 0.1% by weight of the powder; and
   (b) sintering the green compact under non-oxidising conditions to form a ceramic material comprising alumina and carbon, wherein the green compact is sintered at a temperature of less than 1550° C.;
   wherein the powder contains carbon in the form of carbon particles and wherein the ceramic material exhibits a predominantly transgranular mode of fracture.

2. A process according to claim 1, wherein the powder comprises alumina particles having an average diameter of from about 1 nm to about 1 μm.

3. A process according to claim 1, wherein the carbon particles have an average diameter of from about 1 nm to about 1 μm.

4. A process according to claim 3, wherein the particles are in the form of graphite particles.

5. A process according to claim 1, wherein the powder contains carbon in the form of an organic precursor.

6. A process according to claim 1, wherein the carbon is present in the powder in an amount of from about 0.01% to about 0.05% by weight of the powder.

7. A process according to claim 1, wherein the green compact is sintered at a temperature of from about 1350° C. to about 1500° C.

8. A process according to claim 1, wherein the green compact is sintered by pressureless sintering.

9. A process according to claim 8, wherein the green compact is sintered in vacuo.

10. A process according to claim 1, which further comprises forming the material as, or converting the material into, a wear resistant product.

11. A process according to claim 1, wherein the ceramic material is substantially free of discrete particles of carbon.

* * * * *